US012736992B2

(12) United States Patent
Hung et al.

(10) Patent No.: US 12,736,992 B2
(45) Date of Patent: Sep. 15, 2026

(54) DIGITAL DC-DC VOLTAGE CONVERSION APPARATUS AND ELECTRONIC DEVICE USING THE SAME

(71) Applicant: NUVOTON TECHNOLOGY CORPORATION, Hsinchu City (TW)

(72) Inventors: Yeh-Tai Hung, Zhubei City (TW); Chung Ming Hsieh, Zhubei City (TW)

(73) Assignee: NUVOTON TECHNOLOGY CORPORATION, Hsinchu City (TW)

(*) Notice: Subject to any disclaimer, the term of this patent is extended or adjusted under 35 U.S.C. 154(b) by 164 days.

(21) Appl. No.: 18/643,014

(22) Filed: Apr. 23, 2024

(65) Prior Publication Data

US 2025/0181096 A1 Jun. 5, 2025

(30) Foreign Application Priority Data

Nov. 30, 2023 (TW) ................................ 112146497

(51) Int. Cl.
*G05F 1/59* (2006.01)

(52) U.S. Cl.
CPC ..................................... *G05F 1/59* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | | | |
|---|---|---|---|---|---|
| 7,570,035 | B2 * | 8/2009 | Kleveland | G05F 1/575 323/276 |
| 9,946,281 | B1 * | 4/2018 | Huang | G05F 1/565 |
| 10,198,015 | B1 * | 2/2019 | Ham | G05F 1/575 |
| 11,099,591 | B1 * | 8/2021 | Köse | G05F 1/59 |
| 11,493,945 | B1 * | 11/2022 | Wang | G05F 1/59 |
| 12,292,753 | B2 * | 5/2025 | Mohammad | G05F 1/462 |
| 2017/0212540 | A1 * | 7/2017 | Cho | H03K 5/1534 |
| 2018/0173262 | A1 * | 6/2018 | Yang | G05F 1/563 |
| 2018/0224875 | A1 * | 8/2018 | Ham | G05F 1/466 |
| 2018/0226981 | A1 * | 8/2018 | Salem | H03M 1/0617 |
| 2018/0284823 | A1 * | 10/2018 | Na | G05F 1/575 |
| 2019/0107856 | A1 * | 4/2019 | Lim | G05F 1/59 |
| 2019/0250657 | A1 * | 8/2019 | Kudva | G05F 1/462 |

(Continued)

*Primary Examiner* — Crystal L Hammond
*Assistant Examiner* — Nusrat Quddus
(74) *Attorney, Agent, or Firm* — MUNCY, GEISSLER, OLDS & LOWE, P.C.

(57) ABSTRACT

A digital DC-DC voltage conversion apparatus is used to convert an input voltage into an output voltage for a digital core circuit and generate an output current for the digital core circuit. The digital DC-DC voltage conversion apparatus includes a direct charging path current supply unit. The direct charging path current supply unit includes a direct charging switch and a direct charging path controller electrically connected to the direct charging switch. A control end of the direct charging switch receives a direct charging switch control signal, and the direct charging path controller generates direct charging switch control signal to control the direct charging switch to generate a direct charging path current to the digital core circuit. In this way, the digital DC-DC voltage conversion apparatus can faster track an operation current of the digital core circuit.

11 Claims, 5 Drawing Sheets

2'

(56) References Cited

U.S. PATENT DOCUMENTS

| | | | | |
|---|---|---|---|---|
| 2022/0011800 | A1* | 1/2022 | Nasir | G05F 1/59 |
| 2025/0036150 | A1* | 1/2025 | Hung | G05F 1/575 |
| 2025/0138560 | A1* | 5/2025 | Tyrrell | G05F 1/468 |
| 2025/0138561 | A1* | 5/2025 | Tyrrell | G05F 1/468 |
| 2025/0138563 | A1* | 5/2025 | Tyrrell | G05F 1/468 |
| 2025/0216879 | A1* | 7/2025 | Lai | G05F 1/575 |

* cited by examiner

DIGITAL DC-DC VOLTAGE CONVERSION APPARATUS AND ELECTRONIC DEVICE USING THE SAME

CROSS-REFERENCE TO RELATED APPLICATION

This application claims the priority benefit of Taiwan application serial no. 112146497, filed Nov. 30, 2023, the full disclosure of which is incorporated herein by reference.

BACKGROUND

Technical Field

The disclosure relates to a technology of digital DC-DC voltage conversion. More particularly, the disclosure relates to a digital DC-DC voltage conversion apparatus which may faster track an operation current of a digital core circuit, and the electronic device using the same.

Description of Related Art

A digital DC-DC voltage conversion apparatus is an element frequently used in electronic devices having a digital core circuit, which is used to convert an input voltage into an output voltage for the digital core circuit and to generate an output current for the digital core circuit as its operation current during operation. Further, the digital DC-DC voltage conversion apparatus receives a clock signal and is triggered during a transition of the clock signal (for example, from low voltage to high voltage, or from high voltage to low voltage), and may, according to the change of the output voltage, adjust the output current output to the digital core circuit so as to track the operating current of the digital core circuit.

Referring to FIG. 1, which is a schematic circuit diagram of a digital DC-DC voltage conversion apparatus of prior art. The digital DC-DC voltage conversion apparatus 1 includes a digital comparator 10, a bi-directional shift register 11, a switching current unit 12 and an output capacitor 14, in which the digital comparator 10 is electrically connected to the bi-directional shift register 11, the bi-directional shift register 11 is electrically connected to the switching current unit 12, and the switching current unit 12 is electrically connected to the output capacitor 14. The digital DC-DC voltage conversion apparatus 1 is electrically connected to a digital core circuit 13, and the digital core circuit 13 is equivalent to a current sink. The digital core circuit 13 receives an output voltage VOUT, which is converted from an input voltage VIN by the digital DC-DC voltage conversion apparatus 1, and receives an output current IOUT as its operation current ILOAD.

The digital comparator 10 is triggered during a transition of a clock signal CLK, is used to compare the output voltage VOUT and a reference voltage VREF, and generates a comparison signal CM. The comparison signal CM is received by the bi-directional shift register 11, and the bi-directional shift register 11 generates a plurality of switch control signals according to the comparison signal CM. The switching current unit 12 has a plurality of switches 121, in which, for each switch 121, the control terminal of the switch 121 receives one switch control signal, and both terminals of the switch 121 are respectively electrically connected to the input voltage VIN and electrically connected to the digital core circuit 13.

When the output current IOUT is not sufficient for the digital core circuit 13 to use (that is, the operation current ILOAD being greater than the output current IOUT), the output voltage VOUT decreases, which causes the reference voltage VREF greater than the output voltage VOUT, and thus the comparison signal CM is at low voltage. Herein, the bi-directional shift register 11 turns on one of the plurality of switches 121 that is not yet turned on to increase the output current IOUT. When the operation current ILOAD is smaller than the output current IOUT, the output voltage VOUT increases, which causes the reference voltage VREF smaller than the output voltage VOUT, and thus the comparison signal CM is at high voltage. Herein, the bi-directional shift register 11 turns off one of the plurality of switches 121 that is already turned on to decrease the output current IOUT. The number of switches turned on and the number of switches turned off among the switches 121 are continuously adjusted until the output voltage VOUT equals the reference voltage VREF.

The plurality of switches 121 are realized through power transistors such as PMOS transistors, and the switching speed of the plurality of switches 121 is limited by a delay of the digital comparator 10. The delay may be usually a couple of nanoseconds, but the change of the operation current ILOAD of the digital core circuit 13 may occur within a nanosecond; that is, like a pulse signal, the operation current ILOAD changes abruptly and massively; in other words, the change of the operation current ILOAD of the digital core circuit 13 is far faster than the delay of the digital comparator 10. As such, the digital DC-DC voltage conversion apparatus 1 may not rapidly track the operation current ILOAD of the digital core current 13; that is, the changing speed of the output current IOUT may not track the changing speed of the operation current ILOAD.

SUMMARY

In view of the issues of prior art, the present invention seeks to provide a digital DC-DC voltage conversion apparatus which may faster track an operation current of a digital core circuit, and the electronic device using the same. In addition to using a switching current unit to generate a summed current for the digital core circuit, the present digital DC-DC voltage conversion apparatus is further additionally configured with a direct charging path current supply unit to generate a direct charging path current for the digital core current to avoid the situation that the abrupt change of the operation current of the digital core circuit causes the output voltage of the digital DC-DC voltage conversion apparatus constantly fluctuating and unable to rapidly go back to a steady state.

According to at least one aspect of the present invention, the present invention provides a digital DC-DC voltage conversion apparatus. The digital DC-DC voltage conversion apparatus is configured to convert an input voltage into an output voltage for a digital core circuit and generate an output current for the digital core circuit. The digital DC-DC voltage conversion apparatus includes a digital comparator, a bi-directional shift register, a switching current unit and a direct charging path current supply unit. The digital comparator is configured to, when triggered by a clock signal, compare the output voltage and a reference voltage to output a comparison signal. The bi-directional shift register is electrically connected to the digital comparator, and is configured to, when triggered by the clock signal, output a plurality of switch control signals according to the comparison signal. The switching current unit is electrically connected to the bi-directional shift register and the digital core circuit, and includes a plurality of switches, in which a plurality of first terminals of the plurality of switches are electrically connected to the input voltage, a plurality of second terminals of the plurality of switches are electrically connected to the digital core circuit, a plurality of control terminals of the plurality of switches respectively receive the plurality of switch control signals, and the plurality of switches are configured to generate a summed current for the digital core circuit. The direct charging path current supply unit is electrically connected to the digital core circuit and the input voltage, and includes a direct charging switch and a direct charging path controller electrically connected to the direct charging switch, in which a first terminal of the direct charging switch receives the input voltage, a second terminal of the direct charging switch is electrically connected to the digital core circuit, a control terminal of the direct charging switch receives a direct charging switch control signal, and the direct charging path controller generates the direct charging switch control signal to control the direct charging switch to generate a direct charging path current for the digital core circuit, in which the output current is a sum of the summed current and the direct charging path current.

According to at least one aspect of the present invention, the present invention also provides a digital DC-DC voltage conversion apparatus. The digital DC-DC voltage conversion apparatus is configured to convert an input voltage into an output voltage for a digital core circuit and generate an output current for the digital core circuit. The digital DC-DC voltage conversion apparatus includes a digital comparator, a summed current modulating signal generator, a summed current generating unit and a direct charging path current supply unit. The digital comparator is configured to, when triggered by a clock signal, compare the output voltage and a reference voltage and output a comparison signal accordingly. The summed current modulating signal generator is electrically connected to the digital comparator, and is configured to, when triggered by the clock signal, output a summed current modulating signal according to the comparison signal. The summed current generating unit is electrically connected to the summed current modulating signal generator, the input voltage and the digital core circuit, and is configured to generate a summed current for the digital core circuit according to the summed current modulating signal. The direct charging path current supply unit is electrically connected to the digital core circuit and the input voltage and is configured to generate a direct charging path current for the digital core circuit, in which the output current is a sum of the summed current and the direct charging path current, and a specific time duration of the direct charging path current supply unit providing the direct charging path current is programmable.

According to at least one aspect of the present invention, the present invention also provides an electronic device. The electronic device includes any of the aforementioned digital DC-DC voltage conversion apparatuses and the digital core circuit.

In conclusion, the digital DC-DC voltage conversion apparatus provided by the present invention and the electronic device using the same may rapidly track the operation current of the digital core circuit, rapidly make the decreasing output voltage go back to the reference voltage, and further realize the technical effect of providing a steady output voltage.

To further understand the technology, means and effects of the present invention, the following detailed description and accompanied drawings may be referred to understand the goals, features and concepts of the present invention thoroughly and specifically. However, the following detailed description and drawings are merely provided as references and explanations of the embodiments of the present invention and not as limitations of the present invention.

BRIEF DESCRIPTION OF THE DRAWINGS

The drawings are provided for those skilled in the art of the present invention to further understand the present invention and are incorporated into and constitute part of the disclosure of the present invention. The drawings show exemplary embodiments of the present invention and are used to explain the principles of the present invention alongside the Specification of the present invention.

DETAILED DESCRIPTION

Figure 1:
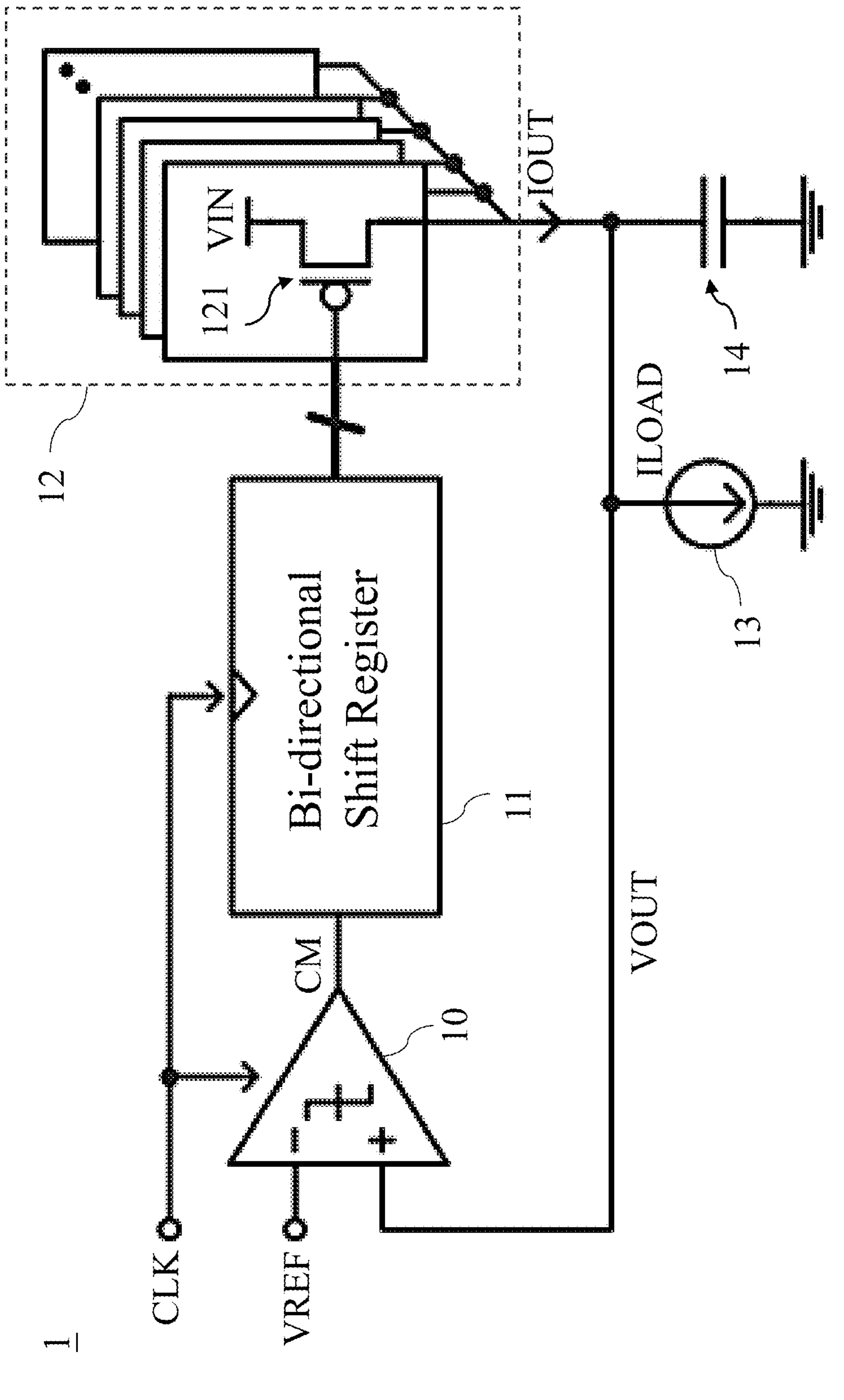
FIG. 1 is a schematic circuit diagram of a digital DC-DC voltage conversion apparatus of prior art.

Herein, exemplary embodiments of the present invention are referred to in detail, and the exemplary embodiments are shown in the drawings. Same element numerals are used to represent same or similar elements in the drawings and Specification whenever possible. Also, the approach of exemplary embodiments is merely one of the realizations of the design concepts of the present invention, and the following plurality of examples are not intended to limit the present invention.

To avoid the occurrence of the technical issues mentioned in the prior art, the present invention provides a digital DC-DC voltage conversion apparatus to convert an input voltage into an output voltage for a digital core circuit and to generate an output current for the digital core circuit. In addition to using a switching current unit to generate a summed current for the digital core circuit, the digital DC-DC voltage conversion apparatus further additionally includes a direct charging path current supply unit. The direct charging path current supply unit includes a direct charging switch and a direct charging path controller electrically connected to the direct charging switch, the control terminal of the direct charging switch receives a direct charging switch control signal, and the direct charging path controller generates the direct charging switch control signal to control the direct charging switch to generate a direct charging path current for the digital core circuit. As such, the digital DC-DC voltage conversion apparatus may faster track an operation current of the digital core circuit.

Figure 2:
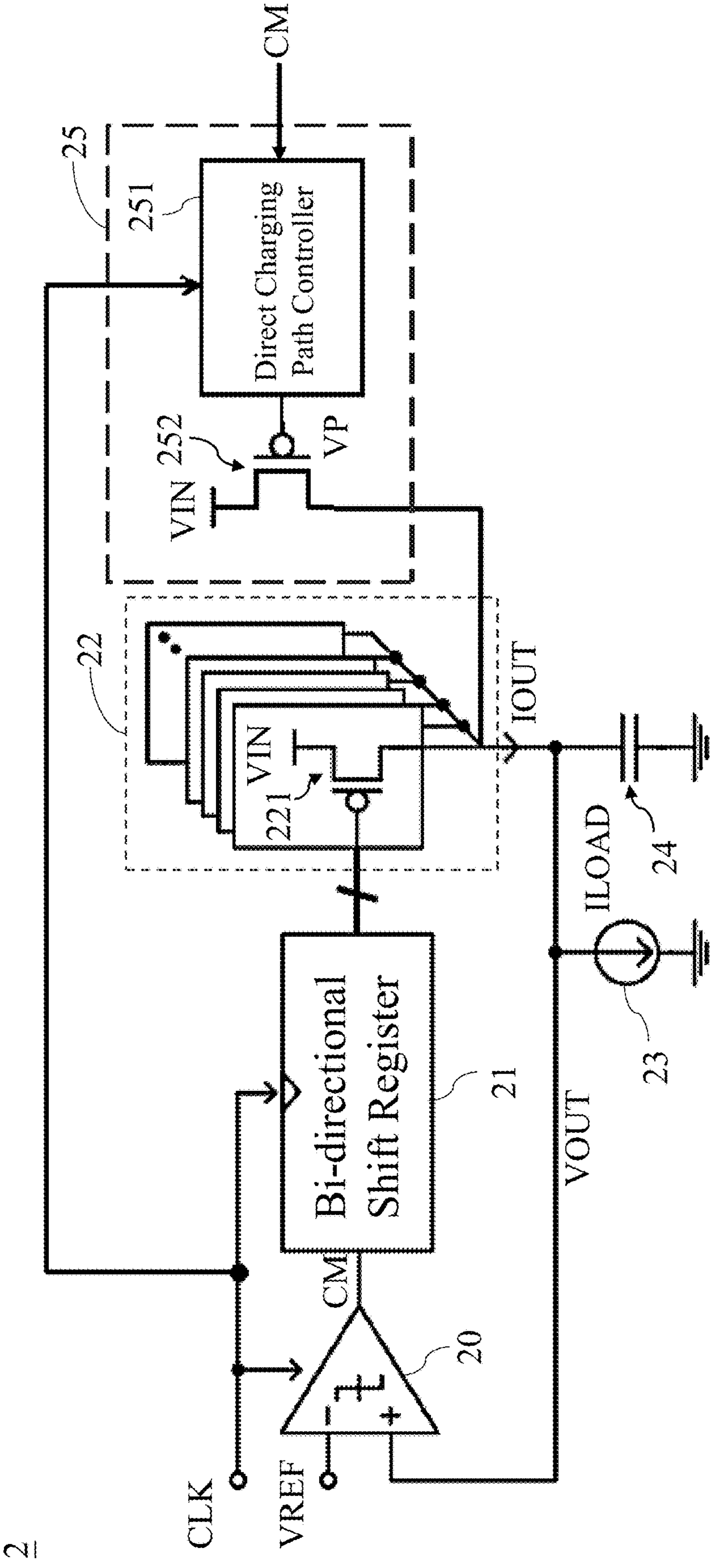
FIG. 2 is a schematic circuit diagram of a digital DC-DC voltage conversion apparatus according to an embodiment of the present invention.

First, please refer to FIG. 2, which is a schematic circuit diagram of a digital DC-DC voltage conversion apparatus according to an embodiment of the present invention. A digital DC-DC voltage conversion apparatus 2 is used to convert an input voltage VIN into an output voltage VOUT for a digital core circuit 23 and generates an output current IOUT for the digital core circuit 23. In the present embodiment, the digital DC-DC voltage conversion apparatus 2 is a digital low-dropout regulator, but the present invention is not limited thereto.

The digital core circuit 23 is equivalent to a current sink, and its operation current ILOAD comes from the output current IOUT corresponding to the output voltage VOUT. When the operation current ILOAD becomes greater, if the output current IOUT is unable to rapidly become greater together, the output voltage VOUT will decrease. Through the configuration of a direct charging path current supply unit 25, the technical issues of the digital DC-DC voltage conversion apparatus 2 described above is solved, and the direct charging path current supply unit 25 may determine whether to generate a direct charging path current for the digital core circuit 23 according to a comparison signal CM between the output voltage VOUT and a reference voltage VREF during the transition of a clock signal CLK, which may also avoid the occurrence of overshooting.

The digital DC-DC voltage conversion apparatus 2 includes a digital comparator 20, a bi-directional shift register 21, a switching current unit 22, an output capacitor 24 and a direct charging path current supply unit 25. The digital comparator 20 is used to compare the output voltage VOUT and the reference voltage VREF and output the comparison signal CM accordingly when triggered by the clock signal CLK (for example, edge-triggering, which is the triggering when the clock signal CLK turns from high voltage to low voltage or turns from low voltage to high voltage). The digital comparator 20 may be a hysteresis digital comparator in the present embodiment, but the present invention is not limited thereto. Additionally, in the present embodiment, the negative input terminal and the positive input terminal of the digital comparator 20 receive the reference voltage VREF and the output voltage VOUT respectively.

The bi-directional shift register 21 is electrically connected to the digital comparator 20 and is used to output a plurality of switch control signals according to the comparison signal CM when triggered by the clock signal CLK. The switching current unit 22 is electrically connected to the bi-directional shift register 21 and the digital core circuit 23 and includes a plurality of switches 221. In the present embodiment, the plurality of switches 221 are a plurality of PMOS transistors. A plurality of first terminals of the plurality of switches 221 (the sources of the PMOS transistors) are electrically connected to the input voltage VIN, a plurality of second terminals of the plurality of switches 221 (the drains of the PMOS transistors) are electrically connected to the digital core circuit 23, a plurality of control terminals of the plurality of switches 221 (the gates of the PMOS transistors) receive a plurality of switch control signals respectively, and the plurality of switches 221 are controlled by the plurality of switch control signals to be turned on or turned off to generate a summed current for the digital core circuit 23.

Further, the bi-directional shift register 21 outputs the shifted results of a plurality of bits temporarily stored therein according to the comparison signal CM, and the shifted plurality of bits are the plurality of switch control signals mentioned above. For example, when the output voltage VOUT is smaller than the reference voltage VREF, the comparison signal CM is at low voltage, causing the bi-directional shift register 21 to perform a leftward shift to increase the number of switches turned on among the switches 221 in the switching current unit 22, typically increasing one at a time, but the present invention is not limited thereto. When the output voltage VOUT is greater than the reference voltage VREF, the comparison signal CM is at high voltage, causing the bi-directional shift register 21 to perform a rightward shift to increase the number of switches turned off among the switches 221 in the switching current unit 22, typically increasing one at a time, but the present invention is not limited thereto.

The direct charging path current supply unit 25 is electrically connected to the digital core circuit 23 and the input voltage VIN and includes a direct charging switch 252 and a direct charging path controller 251 electrically connected to the direct charging switch 252. In the present embodiment, the direct charging switch 252 is a PMOS transistor, but the present invention is not limited thereto. A first terminal of the direct charging switch 252 (the source terminal of the PMOS transistor) receives the input voltage VIN, a second terminal of the direct charging switch 252 (the drain terminal of the PMOS transistor) is electrically connected to the digital core circuit 23, and a control terminal of the direct charging switch 252 (the gate terminal of the PMOS transistor) receives a direct charging switch control signal VP.

The direct charging path controller 251 is electrically connected to the digital comparator 20 and is triggered according to the clock signal CLK, and, when being triggered, the direct charging path controller 251 generates the direct charging switch control signal VP according to the comparison signal CM to control the direct charging switch 252 to generate a direct charging path current for the digital core circuit 23, in which the output current IOUT is the sum of the summed current and the direct charging path current. Also, a first terminal and a second terminal of the output capacitor 24 are respectively electrically connected to the digital core circuit 23 and a ground voltage.

Further, when the output voltage VOUT is smaller than the reference voltage VREF, the direct charging switch control signal VP generated by the direct charging path controller 251 turns from high voltage to low voltage to turn on the direct charging switch 252, in which a specific time duration of the direct charging switch control signal VP at low voltage is programmable. For example, to fit in with different processing procedures or different environmental conditions, the users may configure the aforementioned specific time duration accordingly. The direct charging switch control signal VP is typically a low-voltage pulse, the time duration the direct charging switch 252 being turned on is relatively short, and the direct charging path current is a pulse signal, so that the output current IOUT may rapidly track the operation current ILOAD. When the output voltage VOUT is not smaller than the reference voltage VREF, the direct charging switch control signal VP generated by the direct charging path controller 251 remains at high voltage to turn off the direct charging switch 252.

In brief, if merely the switching current unit 22 is configured, the technical issues mentioned in the prior art that the digital DC-DC voltage conversion apparatus 2 may not rapidly track the operation current ILOAD of the digital core circuit 23 may occur. Thus, a major feature of the present invention is the configuration of the direct charging path current supply unit 25 which may provide a direct charging path current when the output voltage VREF decreases so that the output current IOUT may rapidly track the operation current ILOAD; that is, the digital DC-DC voltage conversion apparatus 2 may rapidly track the operation current ILOAD of the digital core circuit 23.

On the other hand, due to the difference in the duration time of the direct charging path current needed under different processing procedures or environmental conditions, if the duration time of direct charging path current is not sufficient, the digital DC-DC voltage conversion apparatus 2 may not be able to rapidly track the operation current ILOAD of the digital core circuit 23. To allow the technical approaches of the present invention to be applied to different processing procedures or environmental conditions, in the present invention, the specific time duration of the direct charging switch control signal VP at low voltage is designed as programmable.

It is noted that to decrease the time needed for the output current IOUT to track the operation current ILOAD, the direct charging path controller 251 further adjusts the specific time duration of the direct charging switch control signal VP at low voltage according to the comparison signal CM and a preceding comparison signal. For example, if the output voltage VOUT is smaller than the reference voltage VREF in the previous triggering (the preceding comparison signal at low voltage) and the output voltage VOUT is smaller than the reference voltage VREF in the current triggering as well (the comparison signal CM at low voltage), the specific time duration of the direct charging switch control signal VP at low voltage may be increased to decrease the time needed for the output current IOUT to track the operation current ILOAD.

Figure 3:
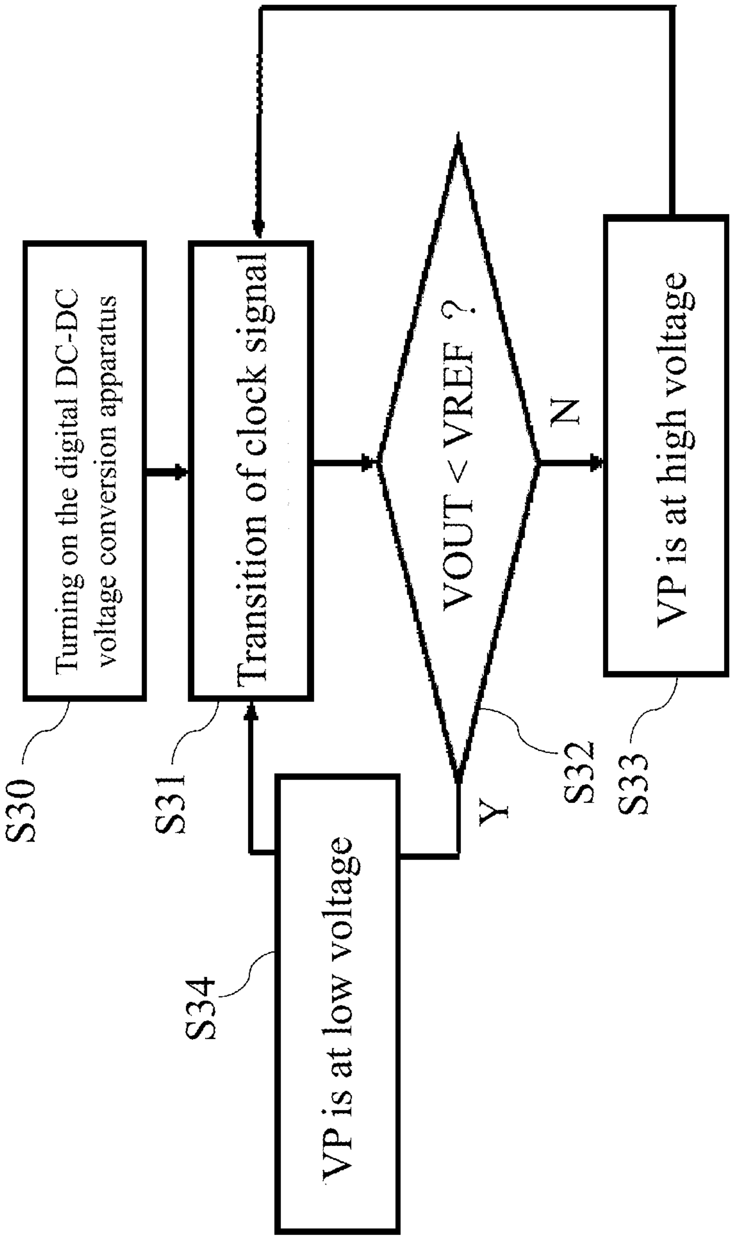
FIG. 3 is a schematic flow diagram of a digital DC-DC voltage conversion method executed by a digital DC-DC voltage conversion apparatus according to an embodiment of the present invention.
Figure 4:
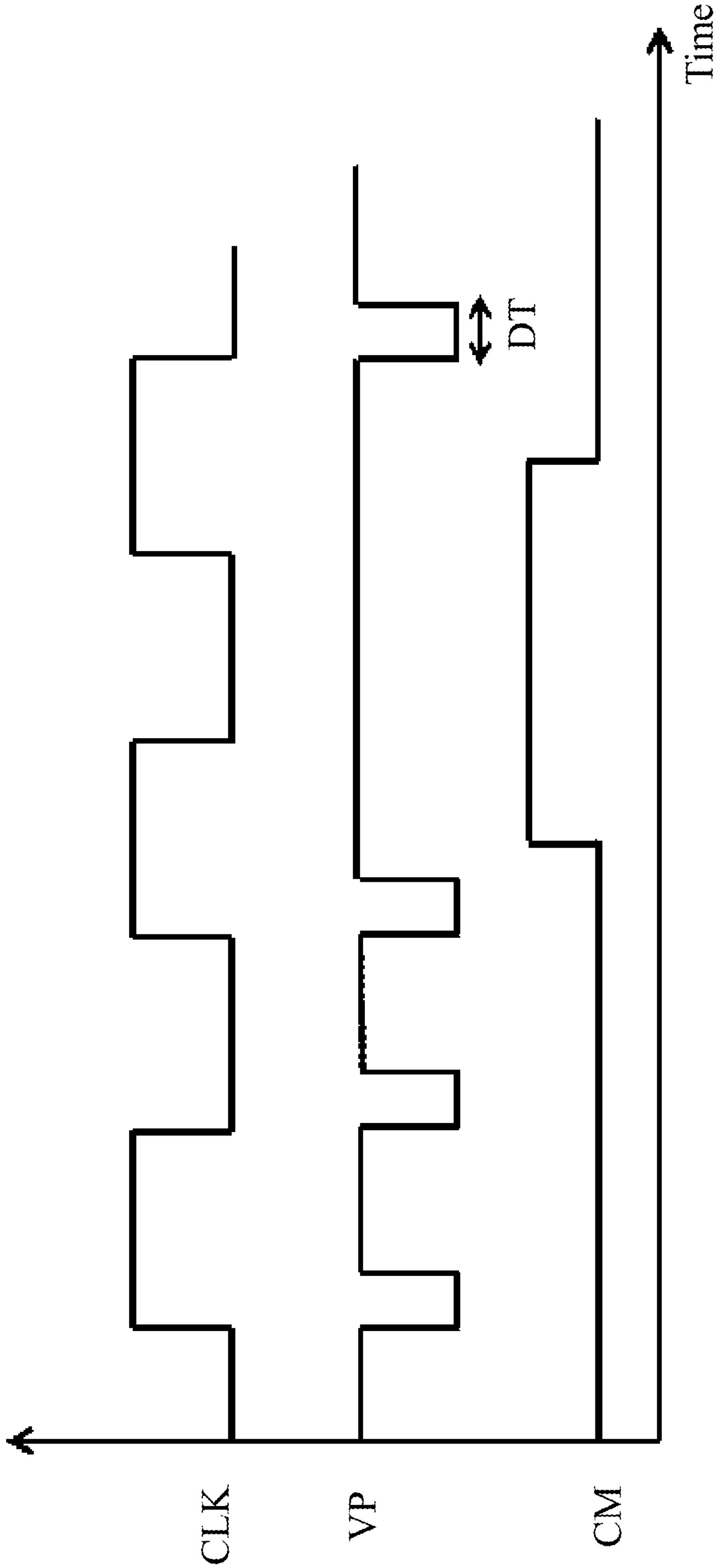
FIG. 4 is a schematic waveform graph of a comparison signal, a clock signal and a direct charging switch control signal in a digital DC-DC voltage conversion apparatus according to an embodiment of the present invention.

Please refer to FIGS. 2 to 4 concurrently, in which FIG. 3 is a schematic flow diagram of a digital DC-DC voltage conversion method executed by a digital DC-DC voltage conversion apparatus according to an embodiment of the present invention, and FIG. 4 is a schematic waveform graph of a comparison signal, a clock signal and a direct charging switch control signal in a digital DC-DC voltage conversion apparatus according to an embodiment of the present invention. First, in a step S30, the digital DC-DC voltage conversion apparatus 2 is turned on. Then, in a step S31, the clock signal CLK transitions from low voltage to high voltage. In a step S32, the direct charging path controller 251 determines whether the comparison signal CM is at high voltage or low voltage, so as to determine whether the output voltage VOUT is smaller than the reference voltage VREF.

When the output voltage VOUT is smaller than the reference voltage VREF (that is, the comparison signal CM is at low voltage), a step S34 is executed. When the output voltage VOUT is greater than the reference voltage VREF (that is, the comparison signal CM is at high voltage), a step S33 is executed. In the step S33, the direct charging path controller 251 turns the generated direct charging switch control signal VP from high voltage to low voltage, holds the voltage for a specific time duration DT and then turns to high voltage. In an embodiment, the specific time duration DT is programmable. In the step S34, the direct charging path controller 251 maintains the generated direct charging switch control signal VP at low voltage. After the end of steps S33 and S34, go back to step S31.

With reference to the flow diagram of FIG. 3, as shown in FIG. 4, during the first three transitions of the clock signal CLK, the comparison signal CM is at low voltage, and thus the direct charging switch control signal VP turns from high voltage to low voltage (to turn on the direct charging switch 252), holds the voltage for the specific time duration DT and then turns to high voltage (to turn off the direct charging switch 252). During the fourth transition of the clock signal CLK, the comparison signal CM is at high voltage, and thus the direct charging switch control signal VP remains at high voltage.

Figure 5:
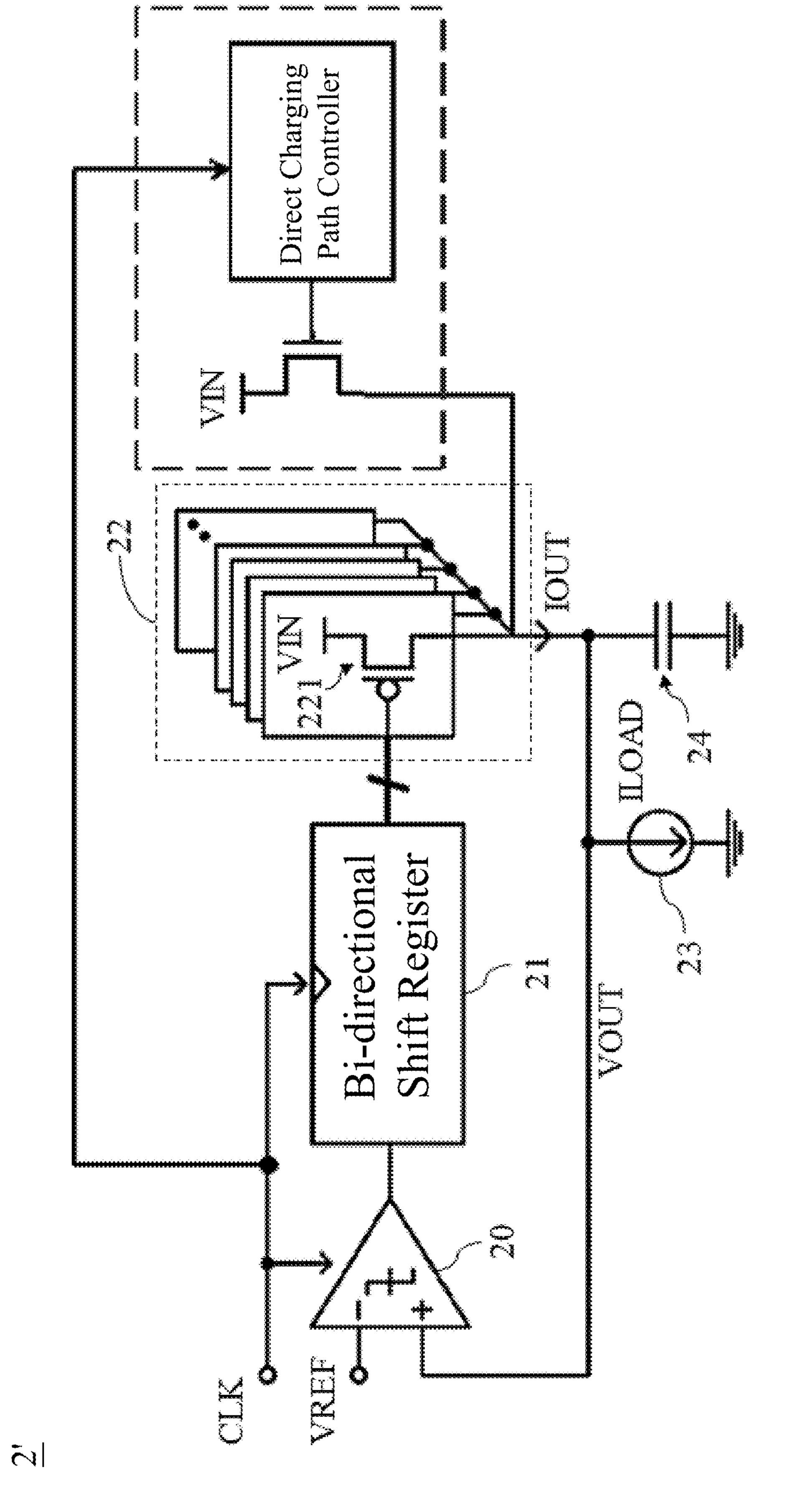
FIG. 5 is a schematic circuit diagram of a digital DC-DC voltage conversion apparatus according to another embodiment of the present invention.

Please refer to FIG. 5, which is a schematic circuit diagram of a digital DC-DC voltage conversion apparatus according to another embodiment of the present invention. Unlike the embodiment shown in FIG. 2, a direct charging switch 252' of a direct charging path current supply unit 25' of a digital DC-DC voltage conversion apparatus 2' is an NMOS transistor, a direct charging path controller 251' turns a generated direct charging switch control signal VP' from low voltage to high voltage according to the clock signal CLK, holds the voltage for a specific time duration DT and then turns to low voltage, and the direct charging path controller 251' does not receive the comparison signal CM. Due to the automatic turning off of the direct charging switch 252' when the output voltage VOUT increases to the high voltage of the direct charging switch control signal VP', in the present embodiment, even if the direct charging path controller 251' does not receive the comparison signal CM, the technical issue of overshooting may also be avoided.

On the other hand, the above-mentioned embodiments use bi-directional shift registers and switching current units to provide the summed current as at least part of the output current, but the present invention is not limited thereto. In the present invention, the bi-directional shift register and switching current unit may be replaced with a summed current modulating signal generator and summed current generating units, respectively. Additionally, the present invention also provides an electronic device including any of the aforementioned digital DC-DC voltage conversion apparatuses and digital core circuits, and the type of the digital core circuit is not limited thereto.

In the aforementioned embodiment, the direct charging path current supply unit 25 generates the direct charging switch control signal according to the clock signal CLK, but the present invention is not limited thereto. For example, the direct charging path current supply unit 25 may periodically (distinct from the frequency of the clock signal CLK) generate the direct charging switch control signal or may solely according to the comparison signal CM to generate the direct charging switch control signal.

As a conclusion, a digital DC-DC voltage conversion apparatus and an electronic device using the same provided by the present invention provide a direct charging path current for a digital core circuit with a direct charging path current supply unit to rapidly track an operation current of the digital core circuit, rapidly make a decreasing output voltage go back to a reference voltage and further realize the technical effect of providing a steady output voltage. In addition, a specific time duration of the direct charging path current supply unit providing the direct charging path current is programmable, providing higher adaptability so that the technical approaches of the present invention may be applied to digital DC-DC voltage conversion apparatuses of different processing procedures, temperatures or ages of use, or alternatively, by dynamically adjusting the specific time duration, the decreasing output voltage may go back to the reference voltage more rapidly. Also, both of the two embodiments described in the present invention avoid the technical issue of overshooting through specific design approaches. One of the embodiments is generating a direct charging path current according to a comparison signal during a transition of a clock signal with the direct charging switch using a PMOS transistor, and the other is generating a direct charging path current according to a transition of a clock signal with the direct charging switch using an NMOS transistor.

It should be understood that the examples and embodiments described herein are merely intended to be used as explanations, and various modifications or alterations in view of which are suggested to persons skilled in the art and are included within the spirit and scope and the scope of the appended claims of the present disclosure.

What is claimed is:

1. A digital DC-DC voltage conversion apparatus, configured to convert an input voltage into an output voltage for a digital core circuit and generate an output current for the digital core circuit, comprising:

a digital comparator, configured to compare the output voltage and a reference voltage to output a comparison signal when triggered by a clock signal;

a bi-directional shift register, electrically connected to the digital comparator, and configured to output a plurality of switch control signals based on the comparison signal when triggered by the clock signal;

a switching current unit, electrically connected to the bi-directional shift register and the digital core circuit, and comprising a plurality of switches, wherein a plurality of first terminals of the plurality of switches are electrically connected to the input voltage, a plurality of second terminals of the plurality of switches are electrically connected to the digital core circuit, a plurality of control terminals of the plurality of switches respectively receive the plurality of switch control signals, and the plurality of switches are configured to make a summed current flowing to the digital core circuit; and a direct charging path current supply unit, electrically connected to the digital core circuit and the input voltage, comprising a direct charging switch and a direct charging path controller electrically connected to the direct charging switch, wherein a first terminal of the direct charging switch receives the input voltage, a second terminal of the direct charging switch is electrically connected to the digital core circuit, a control terminal of the direct charging switch receives a direct charging switch control signal, and the direct charging path controller generates the direct charging switch control signal to control the direct charging switch to generate a direct charging path current for the digital core circuit, wherein the output current is a sum of the summed current and the direct charging path current.

2. The digital DC-DC voltage conversion apparatus of claim 1, wherein when the direct charging switch control signal is at a first voltage, the direct charging switch is turned off, when the direct charging switch control signal is at a second voltage, the direct charging switch is turned on, and a specific time duration of the direct charging switch control signal at the second voltage is programmable.

3. The digital DC-DC voltage conversion apparatus of claim 1, wherein when the reference voltage is greater than the output voltage, the plurality of switch control signals output by the bi-directional shift register make an amount of switches turned on in the switching current unit increase, and when the reference voltage is smaller than the output voltage, the plurality of switch control signals output by the bi-directional shift register make an amount of switches turned off in the switching current unit increase.

4. The digital DC-DC voltage conversion apparatus of claim 1, wherein each of the plurality of switches is a PMOS transistor, and a negative input terminal and a positive input terminal of the digital comparator receive the reference voltage and the output voltage, respectively.

5. The digital DC-DC voltage conversion apparatus of claim 1, wherein the direct charging switch is a PMOS transistor, and the direct charging path current supply unit is further electrically connected to the digital comparator, when the direct charging path controller is triggered by the clock signal and the output voltage is smaller than the reference voltage, the direct charging switch control signal generated by the direct charging path controller is changed from a first voltage to a second voltage to turn on the PMOS transistor for a specific time duration.

6. The digital DC-DC voltage conversion apparatus of claim 1, wherein the direct charging switch is an NMOS transistor, when the direct charging path controller is triggered by the clock signal, the direct charging switch control signal generated by the direct charging path controller is changed from a first voltage to a second voltage to turn on the NMOS transistor for a specific time duration.

7. The digital DC-DC voltage conversion apparatus of claim 1, further comprising an output capacitor, and a first terminal and a second terminal of the output capacitor are electrically connected to the digital core circuit and a ground voltage respectively.

8. The digital DC-DC voltage conversion apparatus of claim 1, wherein the digital DC-DC voltage conversion apparatus is a digital low-dropout regulator.

9. The digital DC-DC voltage conversion apparatus of claim 1, wherein the direct charging path controller further adjusts the specific time duration based on the comparison signal and a preceding comparison signal.

10. A digital DC-DC voltage conversion apparatus, configured to convert an input voltage into an output voltage for a digital core circuit and generate an output current for the digital core circuit, comprising:

a digital comparator, configured to compare the output voltage and a reference voltage and output a comparison signal accordingly when triggered by a clock signal;

a summed current modulating signal generator, electrically connected to the digital comparator, and configured to output a summed current modulating signal according to the comparison signal when triggered by the clock signal;

a summed current generating unit, electrically connected to the summed current modulating signal generator, the input voltage and the digital core circuit, configured to generate a summed current for the digital core circuit according to the summed current modulating signal; and a direct charging path current supply unit, electrically connected to the digital core circuit and the input voltage, configured to generate a direct charging path current for the digital core circuit, wherein the output current is a sum of the summed current and the direct charging path current, and a specific time duration of the direct charging path current supply unit providing the direct charging path current is programmable.

11. An electronic device, comprising:

the digital DC-DC voltage conversion apparatus of claim 1, and the digital core circuit.

* * * * *